US012386302B2

(12) United States Patent
Yoshida

(10) Patent No.: US 12,386,302 B2
(45) Date of Patent: Aug. 12, 2025

(54) IMAGE FORMING APPARATUS INCLUDING IMAGE FORMING UNIT DRAWABLE FROM APPARATUS MAIN BODY

(71) Applicant: KYOCERA Document Solutions Inc., Osaka (JP)

(72) Inventor: Takeshi Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/603,029

(22) Filed: Mar. 12, 2024

(65) Prior Publication Data

US 2024/0310772 A1 Sep. 19, 2024

(30) Foreign Application Priority Data

Mar. 15, 2023 (JP) ................................ 2023-040614

(51) Int. Cl.
*G03G 15/01* (2006.01)
*G03G 15/00* (2006.01)
*G03G 21/16* (2006.01)

(52) U.S. Cl.
CPC ..... *G03G 15/6511* (2013.01); *G03G 15/0178* (2013.01); *G03G 21/1647* (2013.01); *G03G 21/1676* (2013.01); *G03G 2215/004* (2013.01); *G03G 2215/00675* (2013.01); *G03G 2215/00898* (2013.01)

(58) Field of Classification Search
CPC ........... G03G 15/0121; G03G 15/0178; G03G 15/6511; G03G 21/1647; G03G 21/1676; G03G 21/1817; G03G 2215/004; G03G 2215/0065; G03G 2215/00898; G03G 2221/1869
See application file for complete search history.

(56) References Cited

U.S. PATENT DOCUMENTS

2015/0063834 A1* 3/2015 Kobayashi ...................... 399/12
2015/0227110 A1 8/2015 Yoshimura et al.
2015/0301497 A1 10/2015 Kawanami
(Continued)

FOREIGN PATENT DOCUMENTS

JP 2014-067005 A 4/2014
JP 2015-206897 A 11/2015

*Primary Examiner* — Sophia S Chen
(74) *Attorney, Agent, or Firm* — Studebaker Brackett PLLC

(57) ABSTRACT

An image forming apparatus includes an image forming unit and a developing separation mechanism. The image forming unit includes an image carrier and a developing device. The developing device includes a developing member and movable in a developing position where the developing member is in contact with the image carrier and a separated position where the developing member is separated away from the image carrier, and is configured to be drawn out from an apparatus main body. The developing separation mechanism includes an arm member configured to interfere with the developing device from a downstream side of a draw-out direction so as to move the developing device from the developing position to the separated position, and to be turned to an upstream side of the draw-out direction by the image forming unit when the image forming unit is drawn out and then be separated from the developing device.

7 Claims, 14 Drawing Sheets

(56) References Cited

U.S. PATENT DOCUMENTS

| | | | | |
|---|---|---|---|---|
| 2017/0010580 | A1 | 1/2017 | Yoshimura et al. | |
| 2017/0146948 | A1 | 5/2017 | Kawanami | |
| 2017/0269541 | A1 | 9/2017 | Kawanami | |
| 2018/0067452 | A1 | 3/2018 | Yoshimura et al. | |
| 2018/0335749 | A1* | 11/2018 | Kawanami ......... | G03G 21/1676 |
| 2019/0171157 | A1 | 6/2019 | Yoshimura et al. | |
| 2019/0369551 | A1 | 12/2019 | Yoshimura et al. | |
| 2020/0225616 | A1 | 7/2020 | Yoshimura et al. | |
| 2021/0405583 | A1 | 12/2021 | Yoshimura et al. | |
| 2023/0093103 | A1 | 3/2023 | Yoshimura et al. | |
| 2023/0367260 | A1 | 11/2023 | Yoshimura et al. | |
| 2024/0103392 | A1* | 3/2024 | Yoshida ............. | G03G 15/0121 |

* cited by examiner

IMAGE FORMING APPARATUS INCLUDING IMAGE FORMING UNIT DRAWABLE FROM APPARATUS MAIN BODY

INCORPORATION BY REFERENCE

This application is based on and claims the benefit of priority from Japanese patent applications No. 2023-040614 filed on Mar. 15, 2023 which is incorporated by reference in its entirety.

BACKGROUND

The present disclosure relates to an image forming apparatus including an image forming unit detachably attached to an apparatus main body.

A tandem color image forming apparatus is provided with an image forming unit detachably supported on an apparatus main body. The image forming unit includes four developing units arranged in parallel. Each developing unit includes a photosensitive drum on which an electrostatic latent image is formed and a developing device having a developing roller which develops the electrostatic latent image with toner.

In such an image forming apparatus, it is necessary to prevent unnecessary adhesion of the toner on the photosensitive drum and to prevent deformation of the developing roller caused by pressing the developing roller on the photosensitive drum. Therefore, the developing device is provided movably at the developing position where the developing roller comes into contact with the photosensitive drum and at the separated position where the developing roller is separated from the photosensitive drum, and the developing device is configured to be moved from the developing position to the separated position by a developing separation mechanism when not printing.

The developing separation mechanism may be provided with an engaging member capable of engaging with a force receiving part provided in the second unit (corresponding to the developing device). The engaging member can be moved to a first position for maintaining the second unit in the separated position by engaging with the force receiving part, to a second position for allowing the second unit to be moved from the separated position to a contact position (corresponding to the developing position) during an image forming operation, and at a third position for allowing the process cartridge (corresponding to the image forming unit) to be attached when the process cartridge is attached.

Further, the developing separation mechanism may have a separation hook engaged with a separation lever provided in the developing device. By engaging the separation hook with the separation lever, the developing device is moved from the developing position to the separated position.

In the above developing separation mechanisms, the engaging member and the separation hook are engaged with the force receiving part and the separation lever of the developing device from the downstream side in the drawing direction of the image forming unit. Therefore, when the image forming unit is drawn out, it is necessary to move the engaging member and the separation hook so as to be separated from the moving space of the image forming unit in order not to interfere with the image forming unit. In both the developing separation mechanisms, there is a problem that this configuration becomes complicated and the cost increases. For example, the former developing separation mechanism is configured to lift the developing unit in conjunction with the opening operation of the outer cover, which complicates the configuration, requires a wide space for accommodating the lifted developing unit, and increases the size of the apparatus.

SUMMARY

An image forming apparatus according to the present disclosure includes an image forming unit and a developing separation mechanism. The image forming unit includes an image carrier and a developing device. On the image carrier, an electrostatic latent image is formed. The developing device includes a developing member developing the electrostatic latent image and movable in a developing position where the developing member is in contact with the image carrier and a separated position where the developing member is separated away from the image carrier, and is configured to be drawn out from an apparatus main body. The developing separation mechanism moves the developing device from the developing position to the separated position. The developing separation mechanism includes an arm member configured to interfere with the developing device from a downstream side of a draw-out direction so as to move the developing device from the developing position to the separated position, and to be turned to an upstream side of the draw-out direction by the image forming unit when the image forming unit is drawn out and then be separated from the developing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an image forming apparatus according to one embodiment of the present disclosure will be described.

Figure 1:
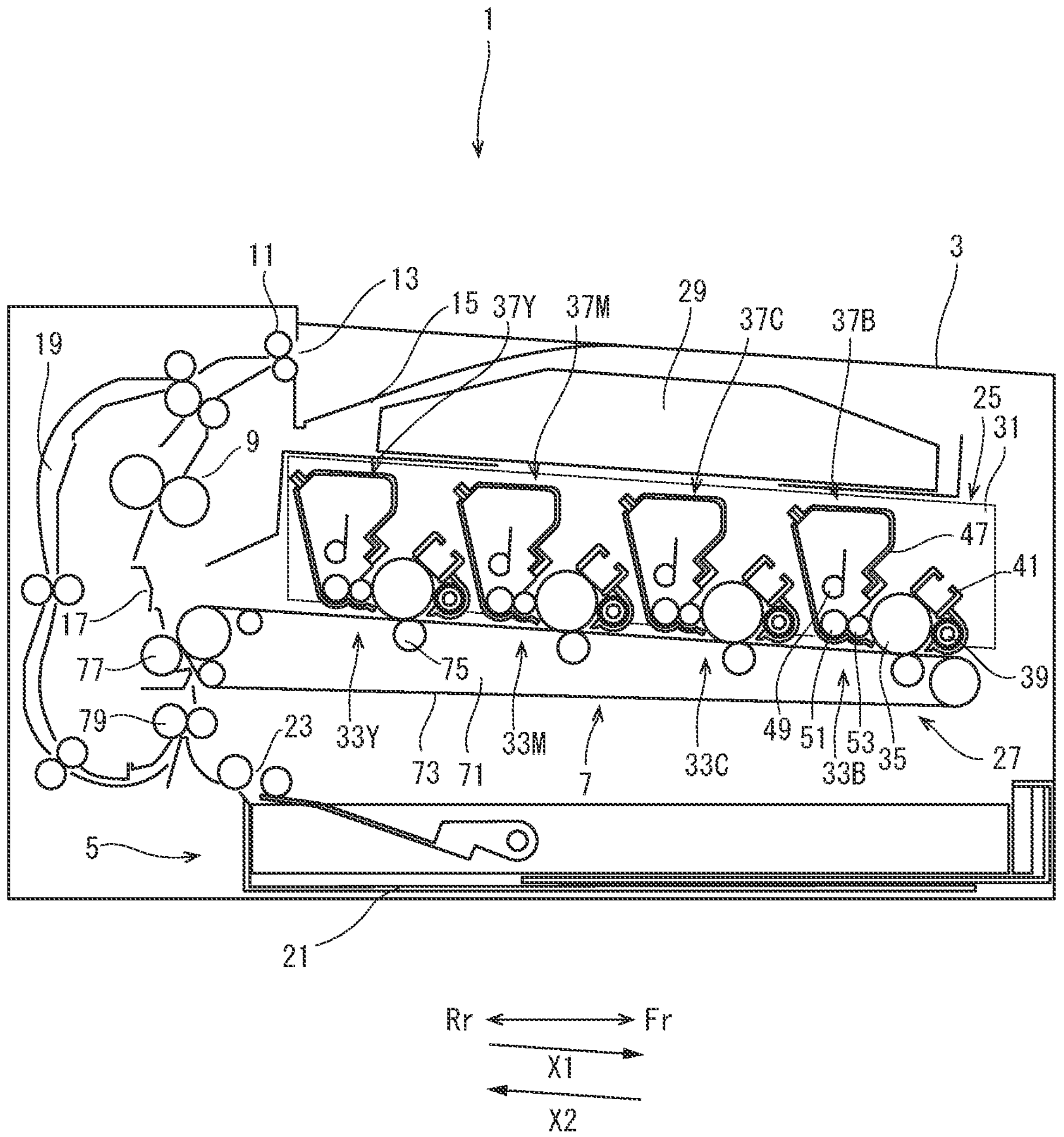
FIG. 1 is a side view schematically showing an internal structure of an image forming apparatus according to one embodiment of the present disclosure.

With reference to FIG. 1, the entire structure of the image forming apparatus 1 will be described. FIG. 1 is a side view schematically showing the internal structure of the image forming apparatus 1. In the figures, Fr, Rr, L, and R indicate the front side, rear side, left side, and right side of the image forming apparatus 1, respectively.

Inside a housing 3 of the image forming sheet feeding apparatus 1, a part 5, an electrophotographic image forming part 7, a fixing device 9, and a discharging device 11 are provided. A discharge port 13 and a discharge tray 15 arranged in front of the discharge port 13 are provided on the upper surface of the housing 3. Further, a main conveyance path 17 and an inversion conveyance 19 for the sheet are provided inside the housing 3.

The sheet feeding part 5 is provided in the lower portion of the inside of the housing 3, and includes a sheet feeding cassette 21 in which the sheet is stored, and a sheet feeding device 23 which feeds the sheet from the sheet feeding cassette 21. The image forming part 7 is provided above the sheet feeding part 5, and includes an image forming unit 25, an intermediate transfer device 27, and an exposure device 29.

The image forming unit 25 includes right and left side plates 31, and four developing units 33Y, 33M, 33C, and 33B corresponding to four colors (yellow, magenta, cyan, and black) of toner and supported between the right and left side plates 31. The four developing units 33Y, 33M, 33C, and 33 B are arranged side by side in the front-and-rear direction. Specifically, the developing units 33Y, 33M, and 33C (referred to as the color developing unit) corresponding to the yellow, magenta, and cyan toner and the developing unit 33B (referred to as the monochrome developing unit) corresponding to the black toner are arranged in order from the rear side to the front side (when both the developing units are commonly described, they are simply referred to as the developing unit 33).

The developing unit 33 includes a photosensitive drum 35, a developing device 37, a cleaning roller 39, and a charging device 41. On the photosensitive drum 35, an electrostatic latent image is formed. The developing device 37 develops the electrostatic latent image into a toner image in a one-component developing system (the developing devices of the color developing units are referred to as the color developing devices 37Y, 37M, 37C, the developing device of the monochrome developing unit is referred to as the monochrome developing device 37B, and when both the developing devices are commonly described, they are simply referred to as the developing device). The cleaning roller 39 removes the toner remaining on the photosensitive drum 35. The charging device 41 charges the photosensitive drum 35. The photosensitive drum 35 is rotatable in the counterclockwise direction of FIG. 1 around a rotational shaft rotatably supported by the left and right side plates 31. The developing device 37, the cleaning roller 39, and the charging device 41 are arranged around the photosensitive drum 35 along the rotational direction of the photosensitive drum 35. The photosensitive drum 35 is an example of an image carrier in the present disclosure.

As will be described later, the developing device 37 is rotatably supported around a rotational shaft 45 (see FIG. 2, not shown in FIG. 1) fixed between the left and right side plates 31. The developing device 37 has a developing housing 47 partitioned into an upper space and a lower space. A developer and a stirring blade 49 for stirring the developer are housed in the upper space, and a supply roller 51 and a developing roller 53 are housed in the lower space. The developing roller 53 is exposed through an opening formed in the developing housing 47, and faces the photosensitive drum 35. The developing roller 53 is an example of the developing member in the present disclosure.

At maintenance or replacement of the components, the image forming unit 25 is drawn out from the housing 3 through an opening (not shown) formed in the front side plate of the housing 3.

The intermediate transfer device 27 is disposed below the image forming unit 25, and includes right and left side plates 71, an endless intermediate transfer belt 73 and four primary transfer rollers 75 corresponding to the four developing units 33 which are supported between the right and left side plates 71, and a secondary transfer roller 77. The intermediate transfer belt 73 is wound around a driving roller, a driven roller and a tension roller arranged between the right and left side plates 71, and travels in the clockwise direction of FIG. 1. The upper traveling track of the intermediate transfer belt 73 is slightly inclined downward from the rear side to the front side (as one example, the angle of inclination is 3 degrees with respect to the horizontal plane). Thus, the length of the image forming apparatus 1 in the front-and-rear direction can be shortened. The image forming unit 25 is attached to and detached from the housing 3 along the inclined direction. A direction from the rear side to the front side along the inclined direction is referred to as a draw-out direction X1 of the image forming unit 25, and the opposite direction to the draw-out direction X1 is referred to as an attachment direction X2 of the image forming unit 25.

The four primary transfer rollers 75 are disposed in the hollow space of the intermediate transfer belt 73 side by side in the front-and-rear direction, and rotatably supported by the left and right side plates 71. The four primary transfer rollers 75 face the photosensitive drums 35 of the four developing units 33 of the image forming unit 25 across the intermediate transfer belt 73 to form primary transfer nips between the intermediate transfer belt 73 and the photosensitive drums 35. The secondary transfer roller 77 faces the driving roller across the intermediate transfer belt 73. A secondary transfer nip is formed between the intermediate transfer belt 73 and the secondary transfer roller 77.

The exposure device 29 is disposed above the image forming unit 25, and exposes the photosensitive drum 35 based on image data. The fixing device 9 is disposed above the secondary transfer nip. The fixing device 9 has a pressing roller and a heating roller, and a fixing nip is formed between both the rollers. The discharge device 11 is disposed above the fixing device 9 inside the discharge port 13.

The main conveying path 17 is formed from the sheet feeding device 23 of the sheet feeding part 5 to the discharging device 11 through the secondary transfer nip and the fixing nip. A registration rollers pair 79 is arranged between the sheet feeding device 23 and the secondary transfer nip on the main conveyance path 17. The inversion conveyance path 19 branches from the main conveyance path 17 on the downstream side of the fixing device 9 in the conveyance direction and merges with the main conveyance path 17 on the upstream side of the registration rollers pair 79.

Next, the image forming operation will be briefly described. In the image forming part 7, the photosensitive drum 35 of each developing unit 33 of the image forming unit 25 is charged by the charging device 41. Thereafter, the photosensitive drum 35 is exposed by the exposure device 29 to form an electrostatic latent image based on the image data. The electrostatic latent image is developed into a toner image by the developer carried on the developing roller 53 of the developing device 37. The toner image is transferred from the photosensitive drum 35 to the intermediate transfer belt 73 in the primary transfer nips. Thus, a full-color toner image is formed on the intermediate transfer belt 73.

On the other hand, in the sheet feeding part 5, the sheet is conveyed from the sheet feeding cassette 21 to the main conveyance path 17 by the sheet feeding device 23. The sheet is conveyed to the secondary transfer nip at appropriate timing by the registration rollers pair 79. At the secondary transfer nip, the toner image formed on the intermediate transfer belt 73 is transferred to one side surface of the sheet. The sheet is conveyed to the fixing device 9 along the main conveyance path 17, and the toner image is fixed to the sheet at the fixing nip. The sheet is further conveyed to the discharge device 11 and discharged to the discharge tray 15 through the discharge port 13 by the discharge device 11.

In the case of duplex printing, the sheet having the toner image fixed on one side surface is conveyed from the main conveyance path 17 to the inversion conveyance path 19, and the toner image is transferred to the other side surface of the sheet at the secondary transfer nip. After the toner image is fixed to the other side surface of the sheet by the fixing device 9, the sheet is conveyed to the discharging device 11 and discharged to the discharging tray 15 through the discharging port 13 by the discharging device 11.

As described above, in order to prevent unnecessary toner adhesion to the photosensitive drum 35 and to prevent deformation of the developing roller 53 caused by pressing the developing roller 53 against the photosensitive drum 35, the developing device 37 is movably provided at a developing position where the developing roller 53 comes into contact with the photosensitive drum 35 and at a separated position where the developing roller 53 is separated from the photosensitive drum 35. The image forming apparatus 1 is provided with a developing separation mechanism 81 (see FIG. 3 and the others, not shown in FIG. 1) which moves the developing device 37, which does not contribute to the image forming operation, from the developing position to the separated position. Hereinafter, the image forming unit 25 and the developing separation mechanism 81 will be described.

Figure 2:
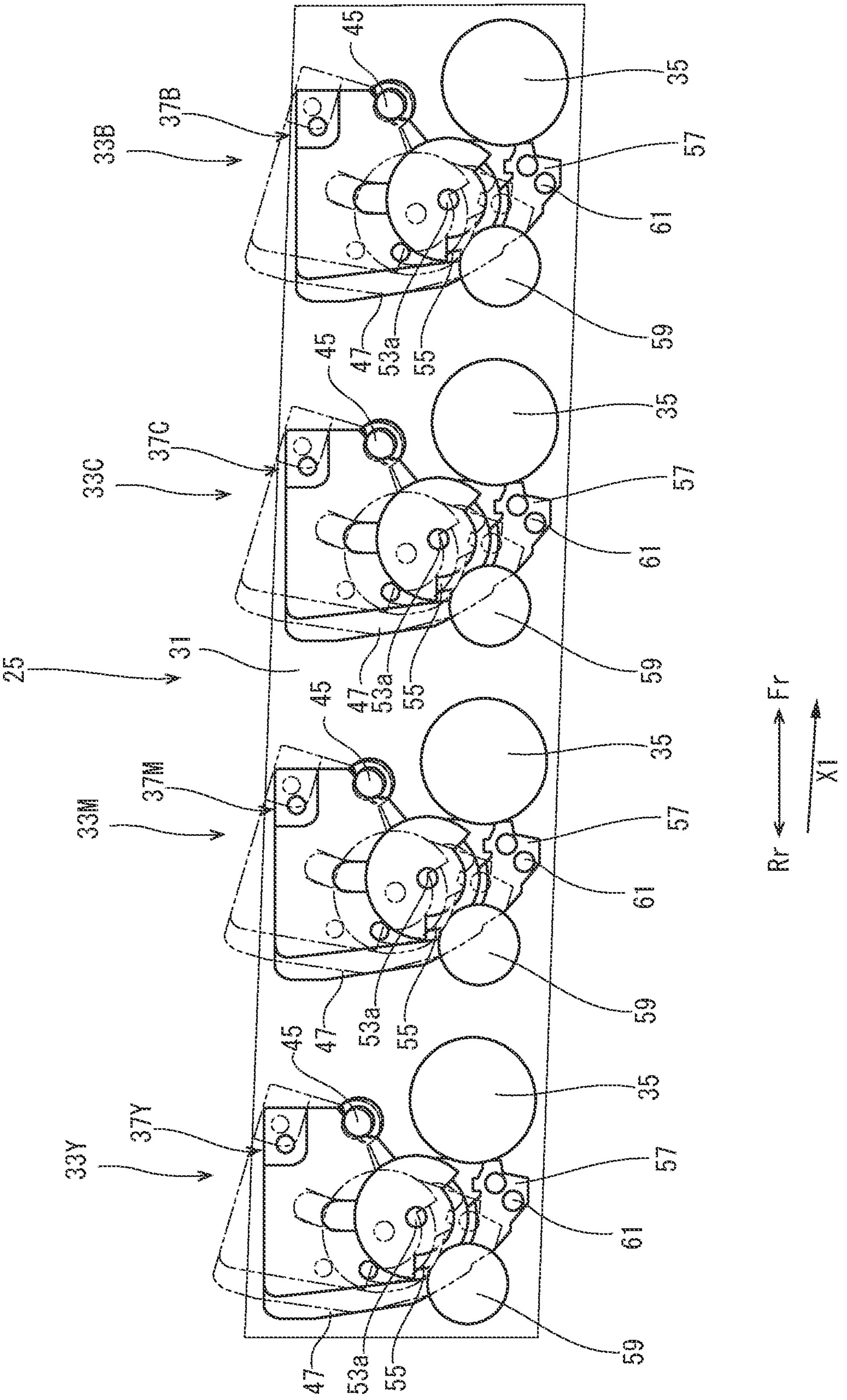
FIG. 2 is a side view showing a developing device and a photosensitive drum of an image forming unit of the image forming apparatus according to the embodiment of the present disclosure.

First, with reference to FIG. 2, the developing device 37 of the image forming unit 25 will be further described. FIG. 2 is a side view showing the developing device 37 and the photosensitive drum 35. As described above, the developing housing 47 of the developing device 37 is rotatably supported by the rotational shaft 45 fixed to the right and left side plates 31 of the image forming unit 25. Specifically, the rotational shaft 45 is fixed to the right and left side plates 31 above the photosensitive drum 35. The developing device 37 is rotatable around the rotational shaft 45 to the developing position (see the solid line in FIG. 2) where the developing roller 53 (not shown in FIG. 2) exposed through the opening of the developing housing 47 is in contact with the photosensitive drum 35, and the separated position where the developing roller 53 is separated from the photosensitive drum 35 (see the dashed line in FIG. 2). A torsional coil spring (not shown) is fitted around the rotational shaft 45. The torsion coil spring biases the developing device 37 to the developing position.

The end portion of the rotational shaft 53*a* of the developing roller 53 is rotatably supported on the left side plate of the developing housing 47, and protrudes from the left side plate. A driving gear 55 is fixed to the protruding end portion. Further, in the lower end portion of the left side plate of the developing housing 47, an interference protrusion 57 protruding downward is formed. The front edge of the interference protrusion 57, that is, the downstream side edge in the draw-out direction X1 of the image forming unit 25 is formed substantially along a line passing through the rotational shaft 45. By pushing the front side edge of the interference protrusion 57 rearward, the developing device 37 rotates in the clockwise direction around the rotational shaft 45. Thus, the developing roller 53 is separated from the photosensitive drum 35, and the developing device 37 is rotated from the developing position to the separated position.

On the inner surface of the left side plate 31 of the image forming unit 25, an output gear 59 capable of meshing with the driving gear 55 is rotatably supported. The output gear 59 is connected to a motor (not shown) as a driving source. As shown by the solid line in FIG. 2, when the developing device 37 is moved to the developing position, the driving gear 55 is meshed with the output gear 59, and the rotational force of the motor is transmitted to the developing roller 53 through the output gear 59 and the driving gear 55. As shown by the dashed line in FIG. 2, when the developing device 37 is moved to the separated position, the driving gear 55 is separated from the output gear 59, and the transmission of the rotational force of the motor from the output gear 59 to the drive gear 55 is cut off. That is, the transmission of the rotational force of the motor to the developing roller 53 is cut off. That is, when the developing device 37 is rotated to the separated position, the developing roller 53 is separated from the photosensitive drum 35 and the transmission of the rotational force to the developing roller 53 is cut off.

Further, a boss 61 protrudes from the inner surface of the left side plate 31 of the image forming unit 25. The boss 61 is formed at the same height position as the interference protrusion 47 of the developing device 37 on the upstream side of the interference protrusion 57 in the draw-out direction X1 of the image forming unit 25.

Figure 3:
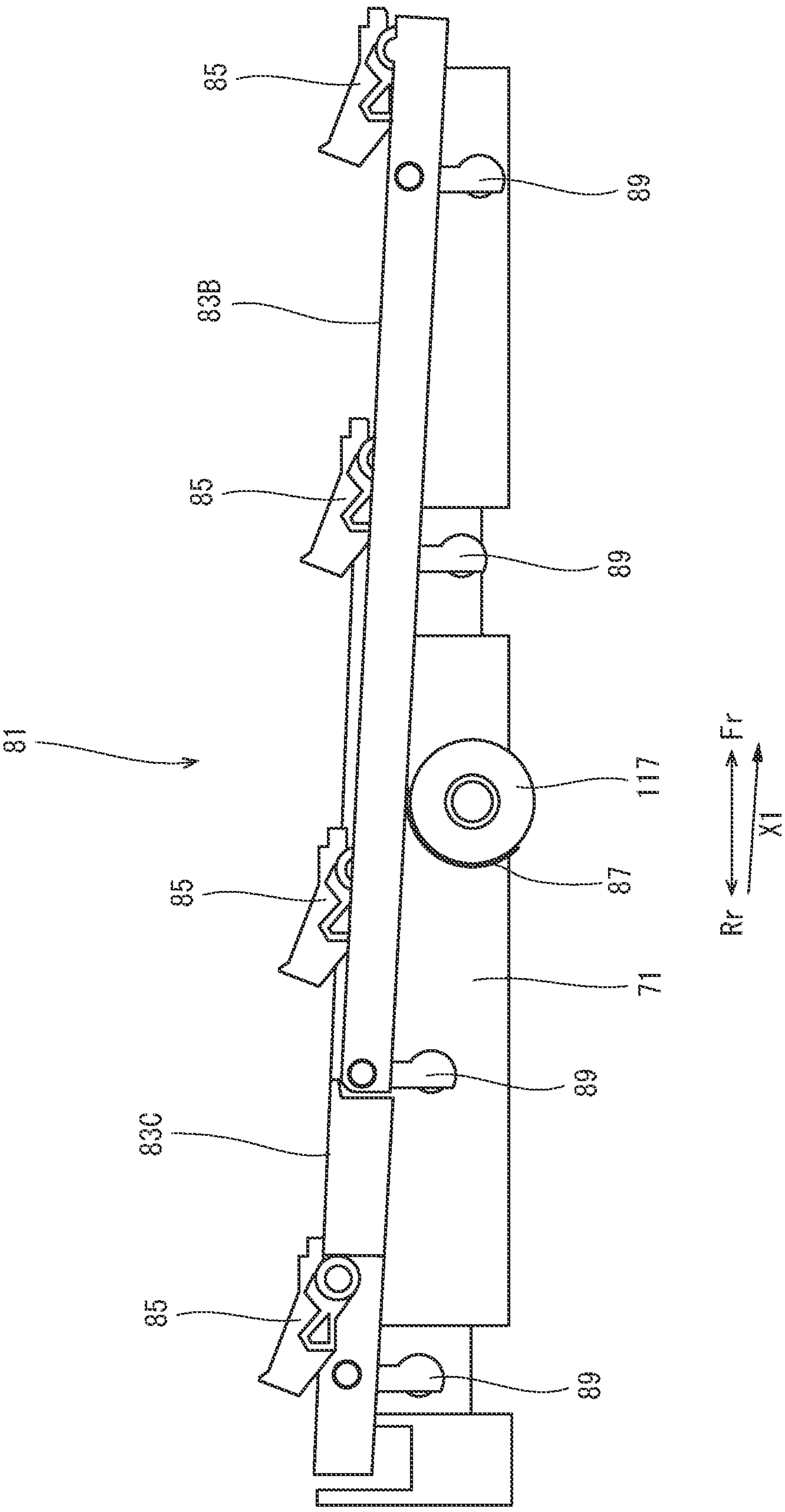
FIG. 3 is a diagram showing a developing separation mechanism of the image forming apparatus according to the embodiment of the present disclosure.
Figure 4:
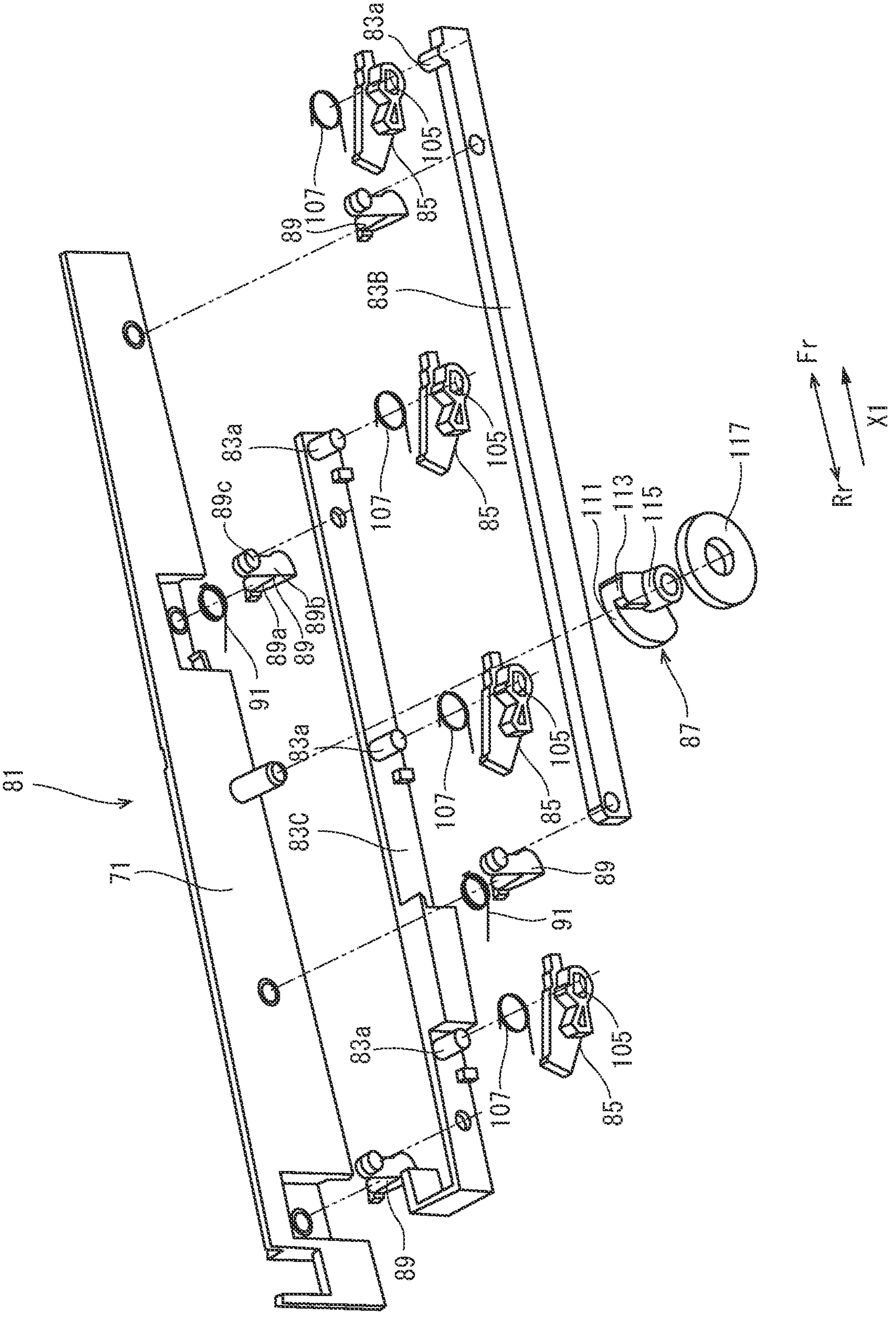
FIG. 4 is a disassembled perspective view showing the developing separation mechanism of the image forming apparatus according to the embodiment of the present disclosure.

Next, the developing separation mechanism 81 will be described with reference to FIG. 3 and FIG. 4. FIG. 3 is a side view showing the developing separation mechanism 81, and FIG. 4 is a disassembled perspective view showing the developing separation mechanism 81. The developing separation mechanism 81 is supported on the left side plate 71 of the intermediate transfer device 27.

The developing separation mechanism 81 is provided with a color separation lever 83C and a monochrome separation lever 83B (simply referred to as the separation lever 83 when both the separation levers are commonly described) supported by the left side plate 71, four arm members 85 supported by the color separation lever 83C and the monochrome separation lever 83B, and a two-stage cam 87 for moving the color separation lever 83C and the monochrome separation lever 83B.

The color separation lever 83C is a plate-like member elongated in the front-and-rear direction. As shown in FIG. 4, three pins 83*a* are protruded on the outer surface of the color separation lever 83C at predetermined intervals in the front-and-rear direction.

The color separation lever 83C is supported on the left side plate 71 by front and rear links 89 in an inclined posture along the draw-out direction X1. As shown in FIG. 4, each link 89 is an L-shaped member viewed from the front-and-rear direction, and has a rotational shaft 89*a* and an arm shaft 89*b* intersecting at approximately right angles. A pin 89*c* protruding in the horizontal direction is provided at the distal end of the arm shaft 89*b*. The distal end portions of the rotational shafts 89*a* of the front and rear links 89 are rotatably supported by the left side plate 71. The pins 89*c* of the arm shafts 89*b* are rotatably supported by the color separation lever 83C. When the front and rear links 89 are turned from a reclined posture in which the arm shaft 89*b* is fallen forward (on the downstream side of the draw-out direction X1) to a standing posture in which the arm shaft 89*b* is raised, the color separation lever 83C is parallel-translated from a lower position to an upper position along the rotational trajectory of the pin 89*c* of the arm shaft 89*b*. That is, the color separation lever 83C is turned from the downstream side to the upstream side in the draw-out direction X1. A torsion coil spring 91 is fitted around rotational shaft 89*a* of the front link 89. The torsional coil spring 91 biases the links 89 to the reclined posture.

The monochrome separation lever 83B is also a plate-like member elongated in the front-and-rear direction. As shown in FIG. 4, one pin 83*a* is protruded on the front end portion of the inner surface of the monochrome separation lever 83B.

The monochrome separation lever 83B is supported on the left side plate 71 by the front and rear links 89 so as to overlap the outside (left side) of the color separation lever 83C in an inclined posture along the draw-out direction X1. The distal end portions of the rotational shafts 89*a* of the front and rear links 89 are rotatably supported by the left side plate 71. The pin 89*c* of the arm shaft 89*b* is rotatably supported by the monochrome separation lever 83B. When the front and rear links 89 are rotated from the reclined posture in which the arm shaft 89*b* is fallen forward (on the downstream side in the draw-out direction X1) to the standing posture in which the arm shaft 89*b* is raised, the monochrome separation lever 83B is parallel-translated from a lower position to an upper position along the rotational trajectory of the pin 89*c* of the arm shaft 89*b*. That is, the monochrome separation lever 83B is rotated from the downstream side to the upstream side in the draw-out direction X1. The torsion coil spring 91 is fitted around the rotational shaft 89*a* of the rear link 89. The torsional coil spring 91 biases the links 89 to the reclined posture.

Figure 5:
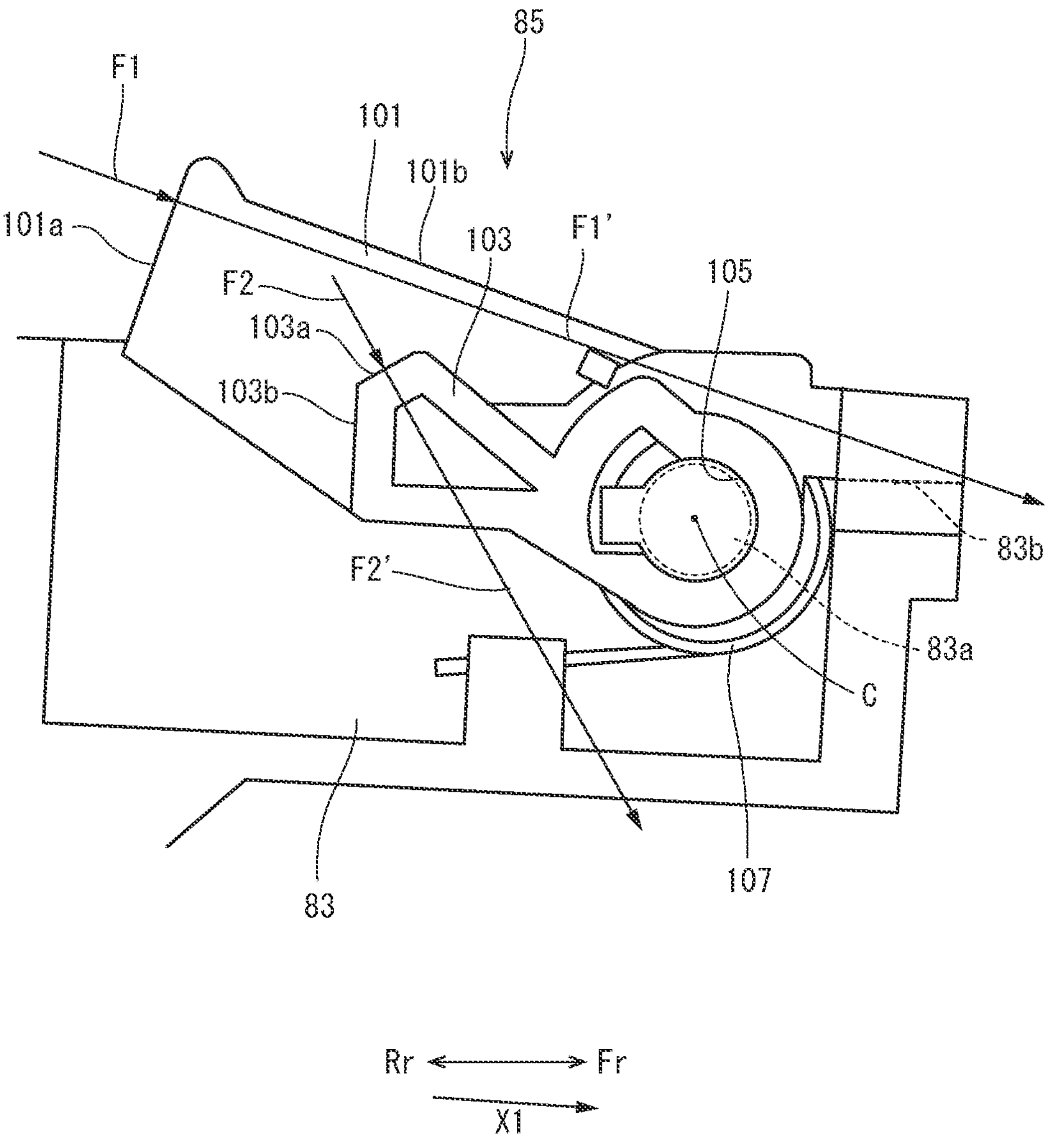
FIG. 5 is a side view showing an arm member of the developing separation mechanism of the image forming apparatus according to the embodiment of the present disclosure.

Next, the arm member 85 will be described with reference to FIG. 5. FIG. 5 is a view showing the arm member 85. As shown in FIG. 3 and FIG. 4, the four arm members 85 are supported by the separation lever 83 so as to correspond to the developing devices 37 of the four developing units 33. That is, the three arm members 85 are supported by the color separation lever 83C at predetermined intervals in the front-and-rear direction, and one arm member 85 is supported by the front end portion of the monochrome separation lever 83B.

As shown in FIG. 5, the arm member 85 has a separation arm 101 and a retreat arm 103 fixed to the outer surface of the separation arm 101. A through hole 105 is formed at one end portion of the arm member 85. By inserting the pin 83*a* protruding from the separation lever 83 into the through hole 105, the arm member 85 is supported by the separation lever 83 in a turning manner around the pin 83*a*. A torsional coil spring 107 is fitted around the pin 83*a*. The torsional coil spring 107 biases the arm member 85 in the clockwise direction of FIG. 5 (the front direction, the downstream side in the draw-out direction X1). At this time, the arm member 85 comes into contact with the rotation stop 83*b* provided on the separation lever 83, so that the arm member 85 is maintained in an upwardly inclined posture (shown in FIG. 5, an initial posture) from the pin 83*a* rearward (to the upstream side of the draw-out direction X1). When the arm member 85 is turned in the counterclockwise direction against the biasing force of the torsion coil spring 107, the arm member 85 is turned so as to be inclined more rearward than the initial posture.

The separation arm 101 has a substantially rectangular shape when viewed from the left side. The distal end portion of the separation arm 101 protrudes so as to extend in the biasing direction (the clockwise direction in FIG. 5) of the torsion coil spring 107. In the initial posture, the tip end surface 101*a* of the separation arm 101 is inclined upward toward the front side (the downstream side of the draw-in direction X1). The upper surface 101*b* of the separation arm 101 is inclined downward toward the front side.

When a force F1 along a direction perpendicular to the tip end surface 101*a* of the separation arm 101 is applied to the upper portion of the tip end surface 101*a* (the downstream portion in the biasing direction of the torsion coil spring 107), the extension line F1' of the applied force F1 passes above the center C of the pin 83*a*, that is above the rotation center C of the arm member 85. Therefore, a rotating force in the clockwise direction is applied to the separation arm 101. However, since the rotation of the arm member 85 in the clockwise direction from the initial posture is restricted by the rotation stop 83*b*, the arm member 85 is maintained in the initial posture.

The retreat arm 103 has a substantially trapezoidal shape when viewed from the left side. The length of the retreat arm 103 from the through hole 105 is shorter than the length of the separation arm 101 from the through hole 105. In the initial posture, the tip end surface of the retreat arm 103 has an upper surface 103*a* and a lower surface 103*b* that meet at an obtuse angle. The upper surface 103*a* is inclined upward toward the front side (the downstream side of the draw-out direction X1). The inclination angle of the upper surface 103*a* with respect to the horizontal plane is smaller than the inclination angle of the tip end surface 101*a* of the separation arm 101 with respect to the horizontal plane.

When a force F2 along in a direction perpendicular to the upper surface 103*a* of the retreat arm 103 is applied to the upper surface 103*a*, the extension line F2' of the applied force F2 passes below the center C of the pin 83*a*, that is below the rotation center C of the arm member 85. Therefore, a rotating force in the counterclockwise direction is applied to the retreat arm 103, and the arm member 85 is turned in the counterclockwise direction from the initial posture against the biasing force of the torsion coil spring 107.

Next, the two-stage cam 87 will be described again with reference to FIG. 3 and FIG. 4. As shown in FIG. 4, the two-stage cam 87 has an inner cam 111 having a center angle of about 180 degrees, an outer cam 113 having a center angle of about 80 degrees, and a gear portion 115. The inner cam 111, the outer cam 113, and the gear portion 115 are provided coaxially. The two-stage cam 87 is arranged below the color separation lever 83C and the monochrome separation lever 83B, and is rotatably supported on the left side plate 71. The inner cam 111 is in contact with the lower surface of the color separation lever 83C, and the outer cam 113 is in contact with the lower surface of the monochrome separation lever 83B. As described above, the color separation lever 83C is biased to the reclined posture by the torsion coil spring 91 fitted around the front link 89, and the monochrome separation lever 83B is biased to the reclined posture by the torsion coil spring 91 fitted around the rear link 89. That is, the color separation lever 83C and the monochrome separation lever 83B are biased so as to be in contact with on the inner cam 111 and the outer cam 113, respectively.

The gear portion 115 is meshed with a driving gear 117. The driving gear 117 is connected to a solenoid (omitted) via a tooth lacking gear (not shown). When the solenoid is driven (energized/de-energized), the gear portion 115, that is, the two-stage cam 87 is rotated in one direction by 120 degrees. In detail, the two-stage cam 87 is rotated in one direction along the clockwise direction in order: in a posture in which the largest diameter portion of the inner cam 111 is in contact with the lower surface of the color separation lever 83C and the largest diameter portion of the outer cam 113 is in contact with the lower surface of the monochrome separation lever 83B; in a posture in which the smallest diameter portion of the inner cam 111 ins in contact with the lower surface of the color separation lever 83C and the smallest diameter portion of the outer cam 113 is in contact with the lower surface of the monochrome separation lever 83B; and in a posture in which the largest diameter portion of the inner cam 111 is in contact with the lower surface of the color separation lever 83C and the smallest diameter portion of the outer cam 113 is in contact with the lower surface of the monochrome separation lever 83B.

Figure 6A:
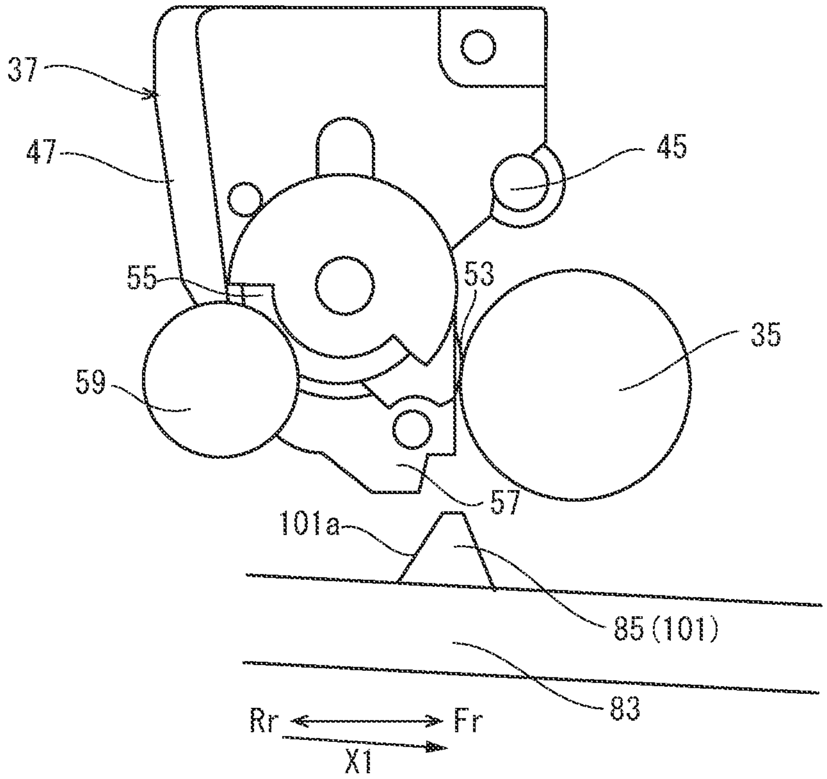
FIG. 6A is a side view showing the developing device turned to a developing position and the photosensitive drum, in the image forming unit of the image forming apparatus according to the embodiment of the present disclosure.
Figure 6B:
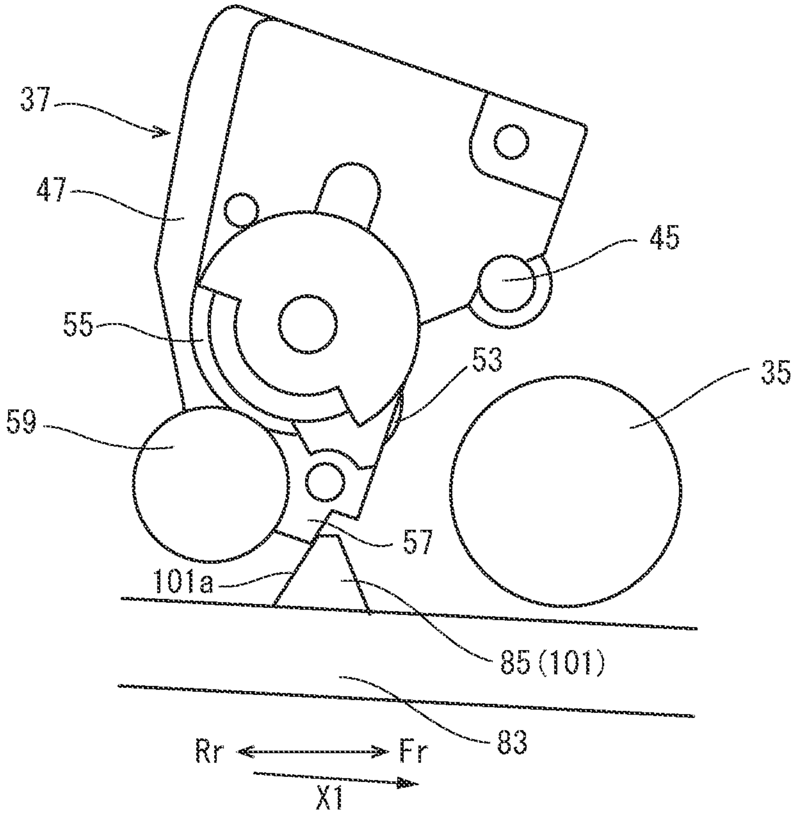
FIG. 6B is a side view showing the developing unit turned to a separated position and the photosensitive drum, in the image forming apparatus according to the embodiment of the present disclosure.

A turning operation of the developing device 37 from the developing position to the separated position by the developing separating mechanism 81 having the above structure, and an operation of the developing separation mechanism 81 when the image forming unit 25 is attached and detached will be described. First, the turning operation of the developing device 37 from the developing position to the separated position by the developing separation mechanism 81 will be described with reference to FIG. 6A and FIG. 6B. FIG. 6A shows the developing position, and FIG. 6B shows the separated position. The following description is common to the color developing device and the monochrome developing device.

In the developing position shown in FIG. 6A, the developing roller 53 is in contact with the photosensitive drum 35. Further, the driving gear 55 of the developing roller 53 is meshed with the output gear 59. The separation lever 83 is translated to the lower position, and the tip end surface 101*a* of the separation arm 101 is positioned in front of (on the downstream side of the drawing direction X1) and below the interference protrusion 57 of the developing device 37.

When the separation lever 83 is translated upward as shown in FIG. 6B, the tip end surface 101*a* of the separation arm 101 of the arm member 85 comes into contact with the front edge of the interference protrusion 57 of the developing device 37 from the downstream side of the draw-out direction X1. Although the clockwise force is applied to the separation arm 101 as described above, since the rotation of the arm member 85 in the clockwise direction is restricted, the arm member 85 is not turned, and the interference protrusion 57 is pushed rearward by the tip end surface 101*a* of the separation arm 101. As a result, the developing device 37 is turned in the clockwise direction around the rotational shaft 45, and moved to the separated position. That is, the developing roller 53 is separated from the photosensitive drum 35, and the driving gear 55 is separated from the output gear 59.

Figure 7A:
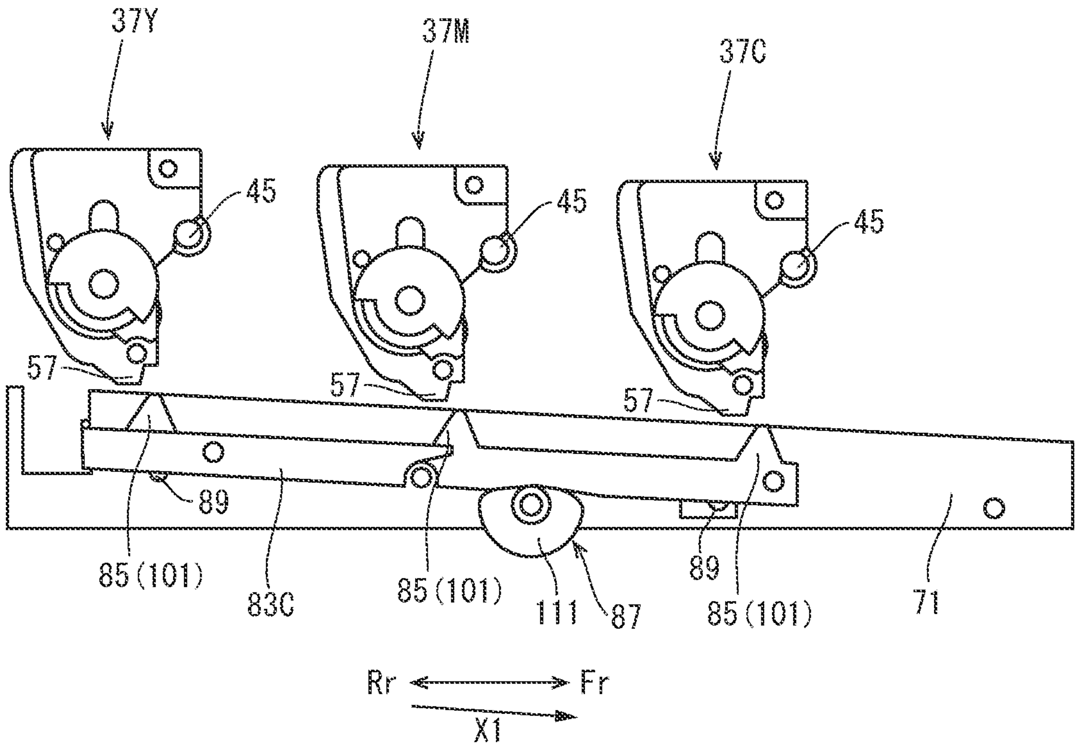
FIG. 7A is a side view showing the color developing devices turned to the developing position and the developing separation mechanism, in the image forming apparatus according to the embodiment of the present disclosure.
Figure 7B:
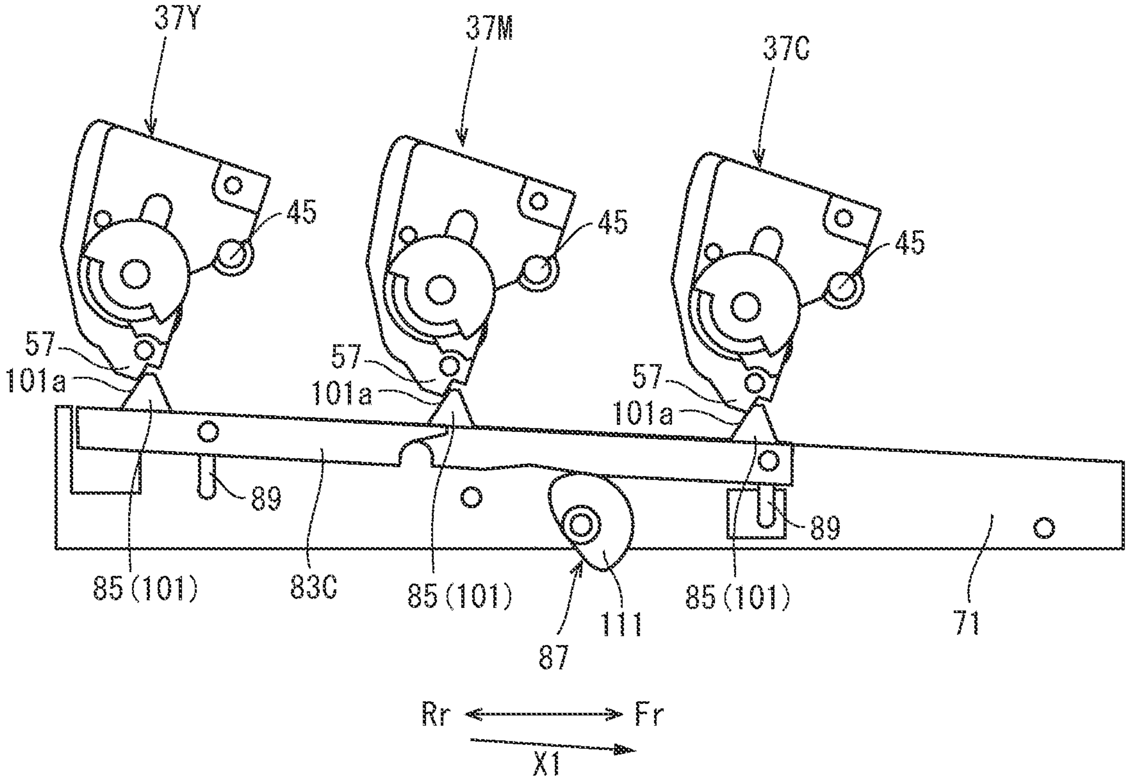
FIG. 7B is a side view showing the color developing devices turned to the separated position and the developing separation mechanism, in the image forming apparatus according to the embodiment of the present disclosure.
Figure 8A:
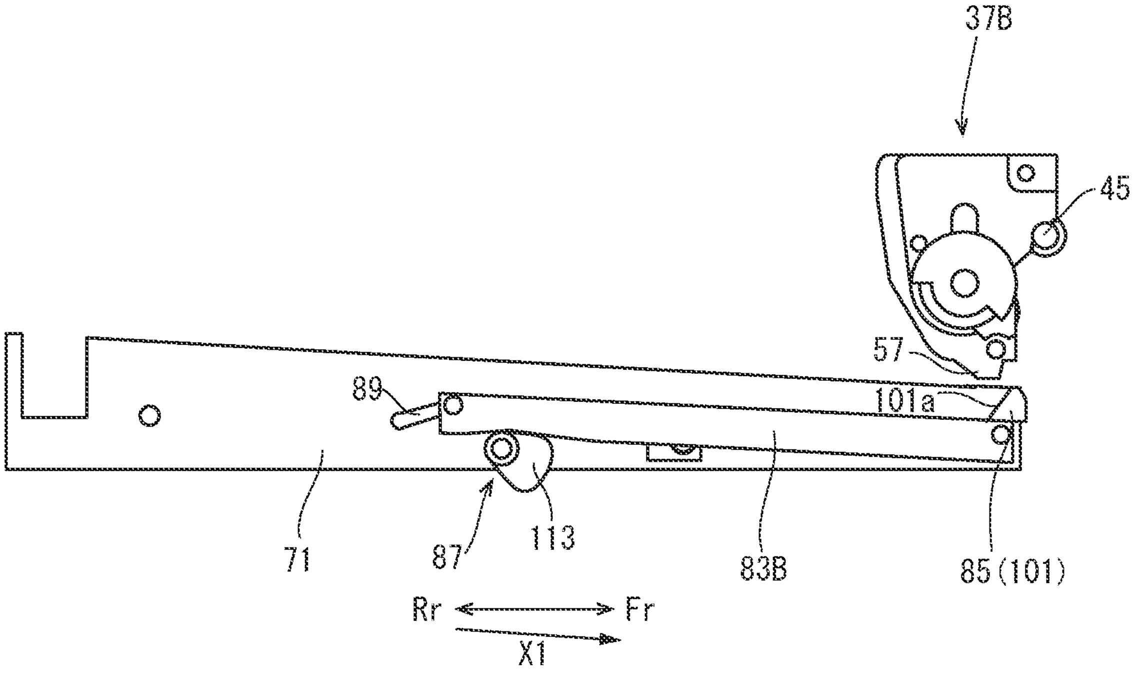
FIG. 8A is a side view showing the monochrome developing device turned to the developing position and the developing separation mechanism, in the image forming apparatus according to the embodiment of the present disclosure.
Figure 8B:
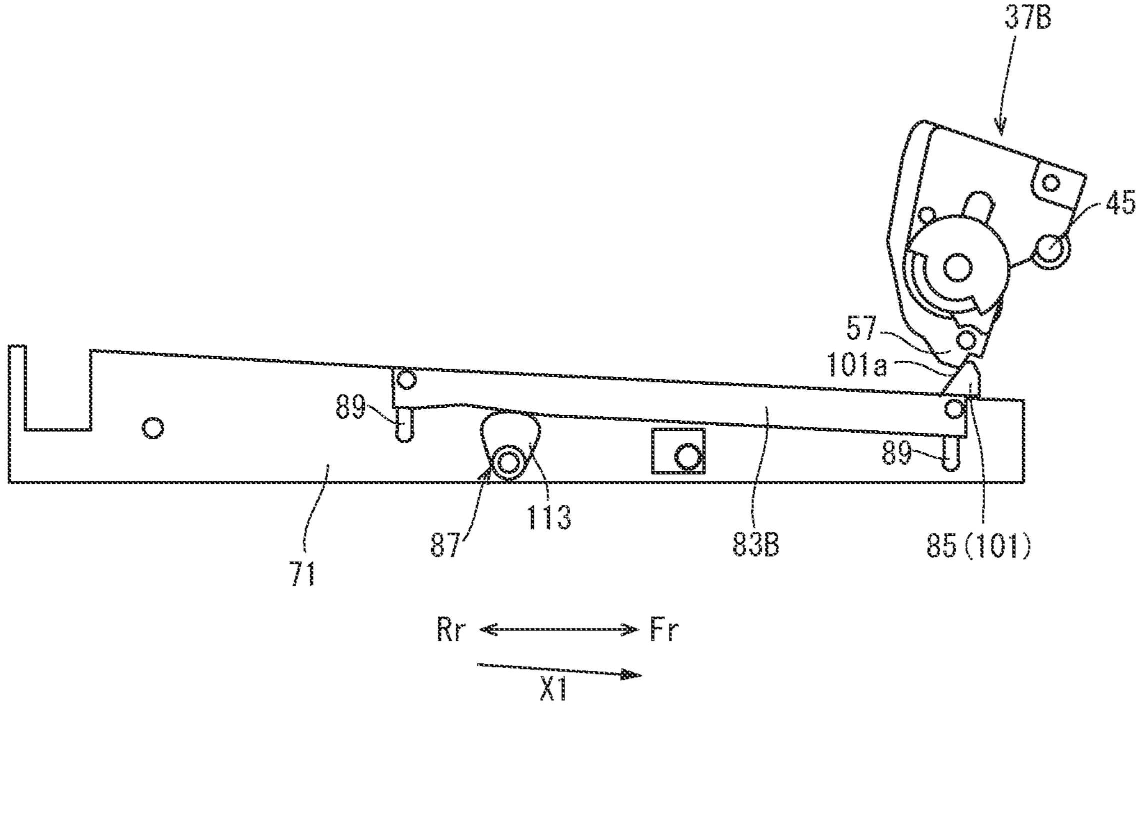
FIG. 8B is a side view showing the monochrome developing device turned to the separated position and the developing separation mechanism, in the image forming apparatus according to the embodiment of the present disclosure.
Figure 9A:
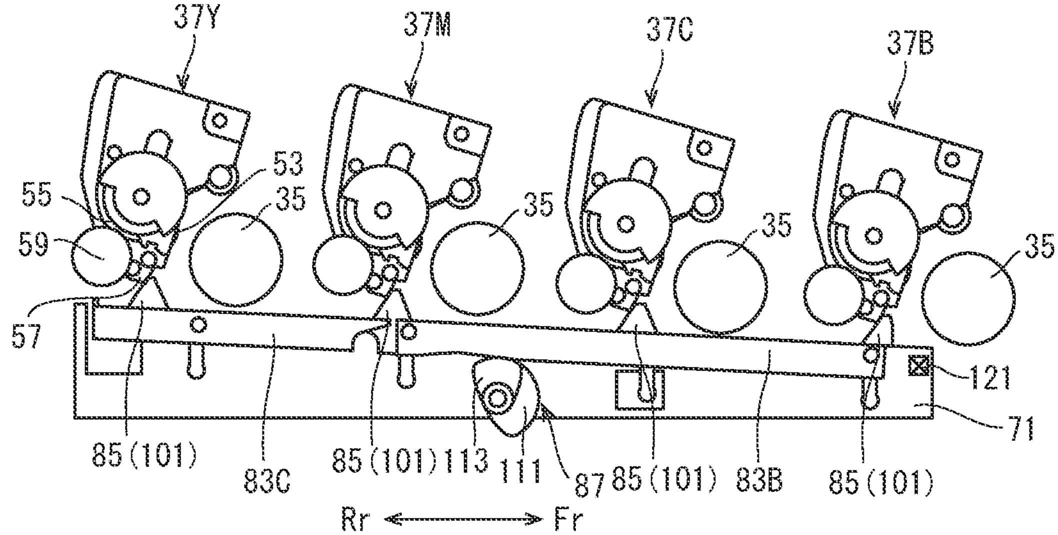
FIG. 9A is a side view showing the image forming unit switched to a four-color separating state, in the image forming apparatus according to the embodiment of the present disclosure.
Figure 9B:
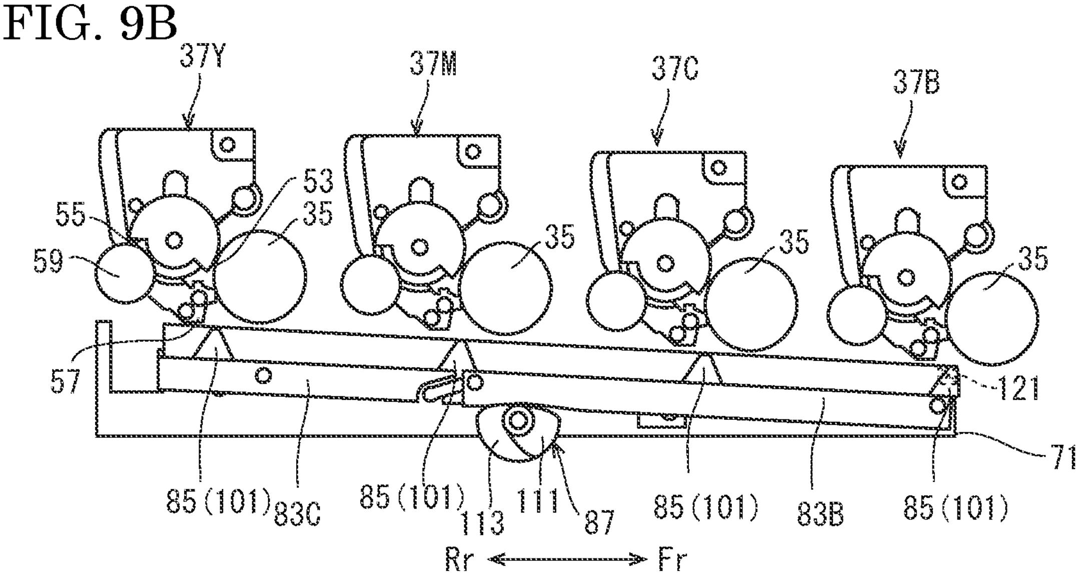
FIG. 9B is a side view showing the image forming unit switched to a color printing state, in the image forming apparatus according to the embodiment of the present disclosure.
Figure 9C:
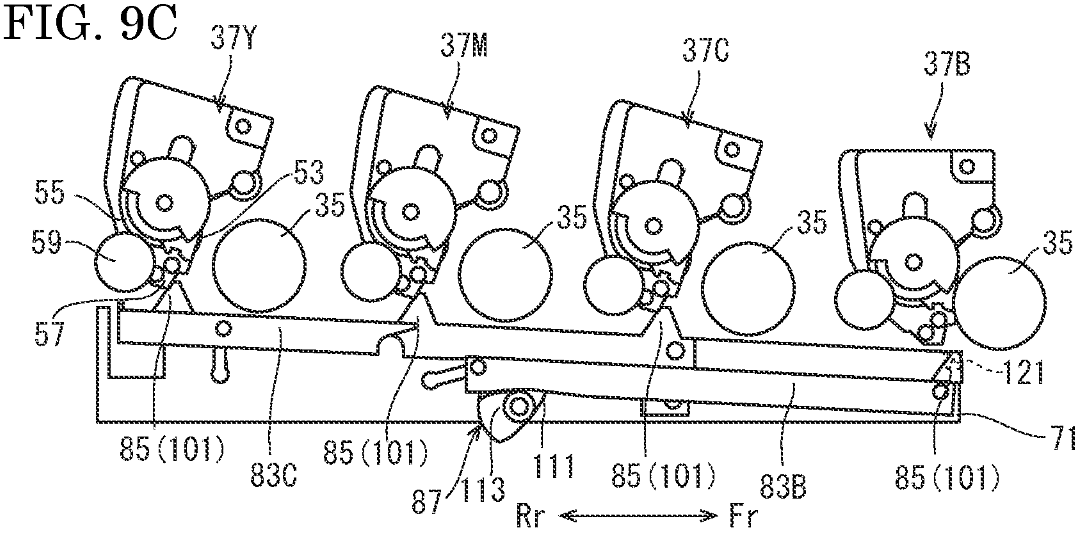
FIG. 9C is a side view showing the image forming unit switched to a monochrome printing state, in the image forming apparatus according to the embodiment of the present disclosure.

Next, the turning operations of the color developing devices 37Y, 37M, 37C and the monochrome developing device 37B by the above-mentioned turning operation will be described with reference to FIG. 7A to FIG. 9C. FIG. 7A and FIG. 7B are views explaining the turning operation of the color developing devices 37Y, 37M, 37C, and FIG. 8A and FIG. 8B are views explaining the turning operation of the monochrome developing device 37B. FIG. 7A and FIG. 8A show the developing position, and FIG. 7B and FIG. 8B show the separated position. FIG. 9A to FIG. 9C are views explaining the turning operation of all the developing devices 37.

As shown in FIG. 7A, when the two-stage cam 87 is rotated such that the smallest diameter portion of the inner cam 111 of the two-stage cam 87 is in contact with the lower surface of the collar separation lever 83C, the link 89 is turned to the reclined posture, and the color separation lever 83C is translated to the lower position. Each arm member 85 is rotated to the initial posture. That is, the tip end surface 101*a* of the separation arm 101 is positioned in front (the downstream side in the draw-out direction X1) and below the interference protrusion 57 of the color developing devices 37Y, 37M, and 37C.

When the two-stage cam 87 is rotated such that the largest diameter portion of the inner cam 111 of the two-stage cam 87 is in contact with the lower surface of the collar separation lever 83C, the collar separation lever 83C is pushed up by the inner cam 111 and is translated to the upper position, and the link 89 is turned to the standing posture. Then, the tip end surface 101*a* of the separation arm 101 of each arm member 85 abuts against the front edge of the interference protrusion 57 of the color developing devices 37Y, 37M, 37C from the downstream side of the draw-in direction X1, and the interference protrusion 57 is pushed rearward by the front end surface 101*a* of the separation arm 101 as described above. Thus, as shown in FIG. 7B, the color developing devices 37Y, 37M, and 37C are turned in the clockwise direction around the rotational shaft 45, and the developing rollers 53 are moved to the separated position separated from the photosensitive drum 35.

As shown in FIG. 8A, when the two-stage cam 87 is rotated such that the smallest diameter portion of the outer cam 113 of the two-stage cam 87 is in contact with the lower surface of the monochrome separation lever 83B, the link 89 is turned to the reclined posture, and the monochrome separation lever 83B is translated to the lower position. Each arm member 85 is turned to the initial posture. That is, the tip end surface 101*a* of the separation arm 101 is positioned in front of (the downstream side in the draw-in direction X1) and below the interference protrusion 57 of the monochrome developing device 37B.

When the two-stage cam 87 is rotated such that the largest diameter portion of the outer cam 113 of the two-stage cam 87 is in contact with the lower surface of the monochrome separation lever 83B, the monochrome separation lever 83B is pushed upward by the outer cam 113, and is translated to the upper position, and the link 89 is turned to the standing posture. Then, the tip end surface 101*a* of the separation arm 101 of each arm member 87 abuts against the front edge of the interference protrusion 57 of the developing device 37 from the downstream side of the draw-in direction X1, and the interference protrusion 57 is pushed rearward by the tip end surface 101*a* of the separation arm 101 as described above. Thus, as shown in FIG. 8B, the monochrome developing device 37B is turned in the clockwise direction around the rotational shaft 45, and the developing roller 53 is moved to the separated position separated from the photosensitive drum 35.

By the combination of the above operations, the developing separation mechanism 81 can switch the image forming unit 37 to a four-color separation state (see FIG. 9A) for moving the monochrome developing device 37B and the three color developing devices 37Y, 37M, and 37C to the separated position, a color printing state (see FIG. 9B) for moving the monochrome developing device 37B and the three color developing devices 37Y, 37M, and 37C to the developing position, and a monochrome printing state (see FIG. 9C) for moving the monochrome developing device 37B to the developing position and moving the three color developing devices 37Y, 37M, and 37C to the separated position.

In the four-color separation state shown in FIG. 9A, the two-stage cam 87 is rotated such that the largest diameter portion of the inner cam 111 and the largest diameter portion of the outer cam 113 are in contact with the lower surface of the color separation lever 83C and the lower surface of the monochrome separation lever 83B. As a result, the color separation lever 83C and the monochrome separation lever 83B are translated to the upper position, the interference protrusions 57 of the developing devices 37 are pushed by the separation arm 101, and all the developing devices 37 are turned to the separated position. This state is the initial state (home position) of the image forming unit 25. When the color printing and monochrome printing are finished, the image forming unit 25 is switched to the four-color separation state by the developing separation mechanism 81. As described above, since the developing rollers 53 of all the developing devices 37 are separated from the photosensitive drum 35, unnecessary adhesion of the toner to the photosensitive drum 35 and deformation of the developing roller 53 can be prevented, and the life of the image forming unit 25 can be extended. Further, the driving gear 55 fixed to the rotational shaft of the developing roller 53 is separated from the output gear 59, the driving gear 55 does not rotate carelessly.

In the color printing state shown in FIG. 9B, the two-stage cam 87 is rotated such that the smallest diameter portion of the inner cam 111 and the smallest diameter portion of the outer cam 113 are contact with the lower surface of the color separation lever 83C and the lower surface of the monochrome separation lever 83B. As a result, the color separation lever 83C and the monochrome separation lever 83B are translated to the lower position, the separation arms 101 are separated from the interference protrusion 57 of the developing device 37, and all the developing devices 37 are turned to the developing position. In this state, the color printing operation is performed.

In the monochrome printing state shown in FIG. 9C, the two-stage cam 87 is rotated such that the largest diameter portion of the inner cam 111 and the smallest diameter portion of the outer cam 113 are in contact with the lower surface of the color separation lever 83C and the lower surface of the monochrome separation lever 83B. As a result, the color separation lever 83*c* is translated to the upper position, and the monochrome separation lever 83B is translated to the lower position. That is, the interference protrusion 57 of the color developing devices 37Y, 37M, 37C are pushed by the separation arms 101 of the color separation lever 83C, and the color developing device 37Y, 37M, 37C are turned to the separated position. On the other hand, the separation arm 101 of the monochrome separation lever 83B is separated from the interference protrusion 57 of the monochrome developing device 37B, and the monochrome developing device 37B is turned to the developing position. In this state, the monochrome printing operation is performed. As described above, since the developing rollers 53 of the color developing device 37Y, 37M, and 37C that do not contribute to the monochrome printing are separated from the photosensitive drum 35, unnecessary adhesion of the toner to the photosensitive drum 35 and deformation of the developing roller 53 can be prevented.

The image forming unit 25 is sequentially switched to the four-color separation state (see FIG. 9A), the color printing state (see FIG. 9B), and the monochrome printing state (see FIG. 9C).

Figure 10A:
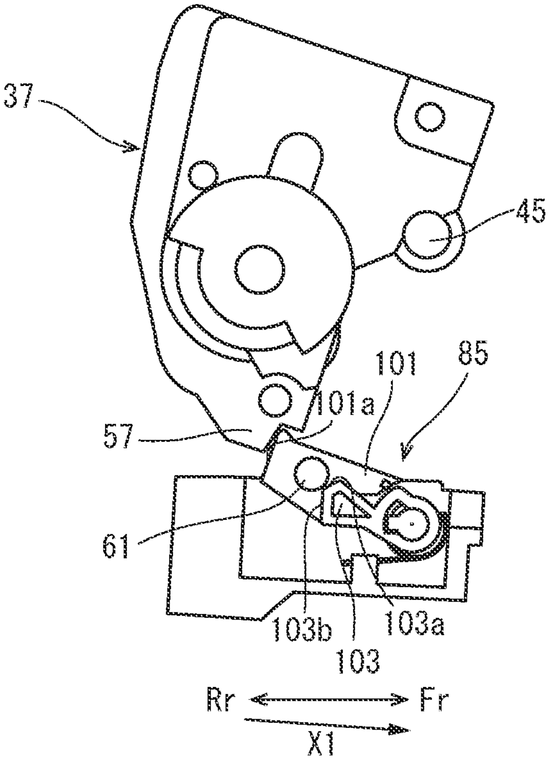
FIG. 10A is a side view explaining an operation of the developing separation mechanism when the image forming unit is drawn out, in the image forming apparatus according to the embodiment of the present disclosure.
Figure 10B:
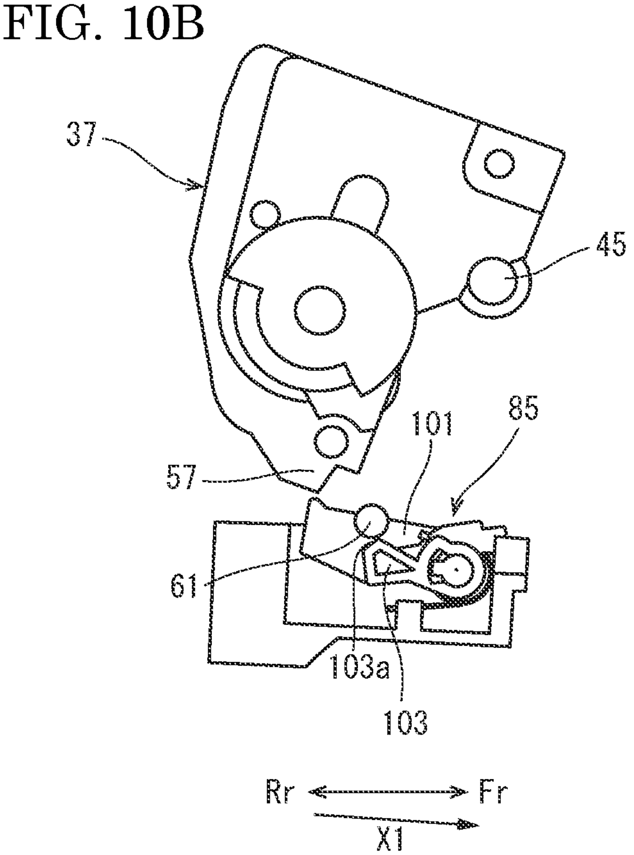
FIG. 10B is a side view explaining the operation of the developing separation mechanism when the image forming unit is drawn out, in the image forming apparatus according to the embodiment of the present disclosure.
Figure 11:
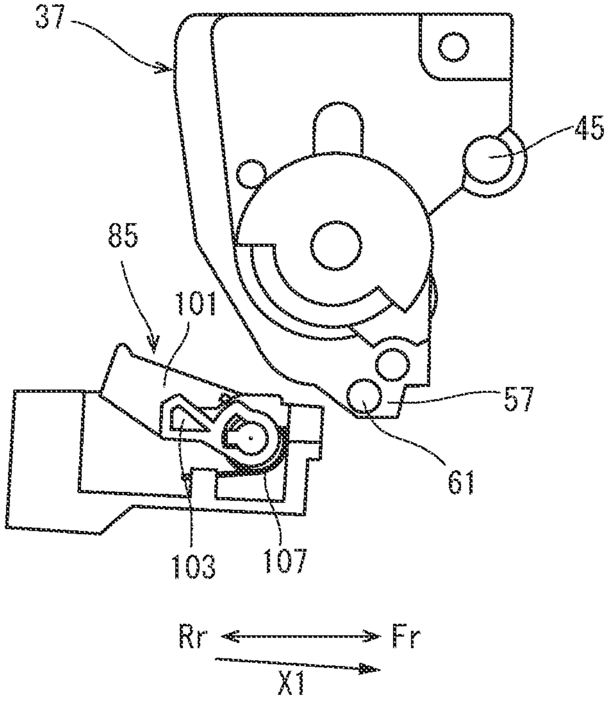
FIG. 11 is a side view explaining the operation of the developing separation mechanism when the image forming unit is drawn out, in the image forming apparatus according to the embodiment of the present disclosure.
Figure 12A:
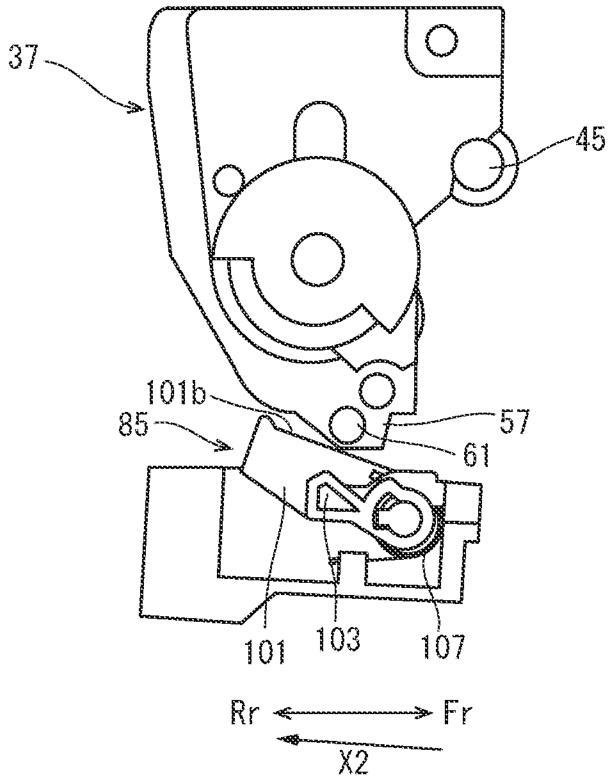
FIG. 12A is a side view explaining the operation of the developing separation mechanism when the image forming unit is attached, in the image forming apparatus according to the embodiment of the present disclosure.

Next, the operation of the developing separation mechanism 81 at the time of attaching and detaching the image forming unit 25 will be described with reference to FIG. 10A to FIG. 11 and FIG. 12A to FIG. 13. FIG. 10A to FIG. 11 are views explaining the operation of the developing separation mechanism 81 when the image forming unit 25 is drawn out, and FIG. 12 to FIG. 13 are views explaining the operation of the developing separation mechanism 81 when the image forming unit 25 is attached.

First, the operation of the development separation mechanism 81 when the image forming unit 25 is drawn out will be described with reference to FIG. 10A to FIG. 11. At the end of the color printing and the monochrome printing, the image forming unit 25 is switched to the four-color separation state (the home position, see FIG. 9A), and all the developing devices 37 are moved to the separated position. That is, as shown in FIG. 10A, all the separation arms 101 of the developing separation mechanism 81 are turned to the upper position and abut on the interference protrusions 57 of the development devices 37 from the downstream side of the draw-out direction X1. Further, the boss 61 provided on the side plate 31 of the image forming unit 25 abuts on the corner of the upper surface 103*a* and the lower surface 103*b* of the tip end surface of the retreat arm 103 of the developing separation mechanism 81 from the downstream side of the draw-out direction X1.

When the image forming unit 25 is drawn out along the draw-out direction X1 from this state, the interference protrusion 57 of the developing device 37 interferes with the tip end surface 101*a* of the separation arm 101 of the developing separation mechanism 81, thereby making it impossible to draw out the image forming unit 25. However, the boss 61 of the image forming unit 25 comes into contact with the upper surface 103*a* of the retreat arm 103, and the boss 61 is moved along the upper surface 103*a* as the image forming unit 25 is moved. Then, the retreat arm 103 is pressed downward by the boss 61, and as shown in FIG. 10B, the retreat arm 103 is turned in the counterclockwise direction (the upstream side of the draw-out direction X1). Along with the turning of the retreat arm 103, the separation arm 101 is also turned in the counterclockwise direction, and then the separation arm 101 is separated downward from the interference protrusion 57 of the developing device 37. That is, the arm member 85 retreats from the space on the downstream side of the developing device 37 in the draw-out direction X1. As described above, the arm member 85 is turned to the retreated posture in which the separation arm 101 is separated from the interference protrusion 57 of the developing device 37 to the upstream side in the draw-out direction X1. Thus, the image forming unit 25 can be drawn out along the draw-out direction X1.

As shown in FIG. 11, when the image forming unit 25 is drawn out and the boss 61 is separated from the retreat arm 103, the arm member 85 is biased by the torsion coil spring 107 to return to the initial state. The developing device 37 is turned to the developing position. Since the respective arm members 85 return to the initial state as described above, when the image forming unit 25 is drawn out, the interference protrusions 57 of the developing devices 37 (the color developing device 37Y, 37M, 37C) other than the developing device 37 (the monochrome developing device 37B) disposed on the most downstream side in the draw-out direction X1 interferes with the separation arms 101 of the arm members 85 on the downstream side of the image forming devices 37 in the draw-out direction X1. At this time, the arm member 85 is turned in the counterclockwise direction by the same turning operation of the retreat arm 103 by the boss 61 as described above, and the separation arm 101 is separated from the interference protrusion 57, so that all the developing devices 37, that is the image forming unit 25, can be smoothly drawn out.

Next, the operation of the developing separation mechanism when the image forming unit 25 is attached will be described with reference to FIG. 12A to FIG. 13. When the image forming unit 25 is drawn out, the developing devices 37 are turned to the developing position as described above. In the developing separation mechanism 81, the arm members 85 are turned to the initial state.

As shown in FIG. 12A, when the image forming unit 25 is attached along the attachment direction X2, the interference protrusion 57 of the developing device 37 comes into contact with the upper surface 101*b* of the separation arm 101 of the arm member 85.

Figure 12B:
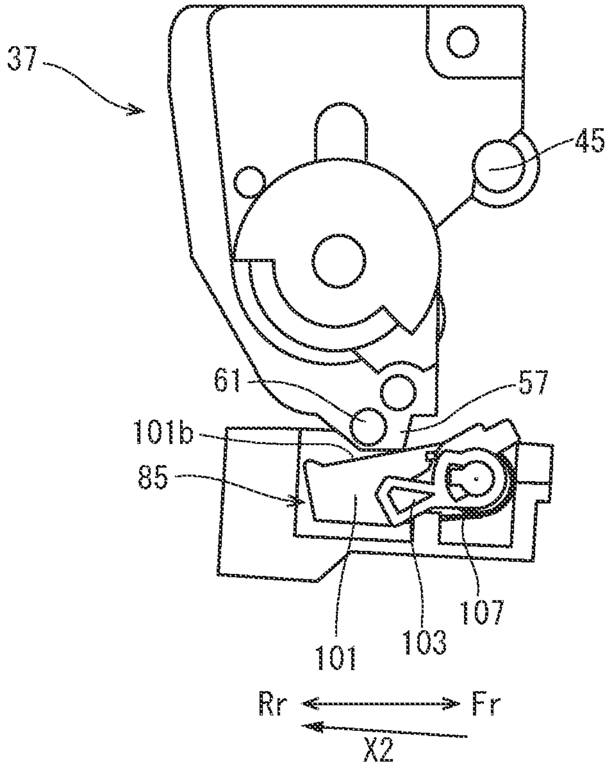
FIG. 12B is a side view explaining the operation of the developing separation mechanism when the image forming unit is attached, in the image forming apparatus according to the embodiment of the present disclosure.
Figure 13:
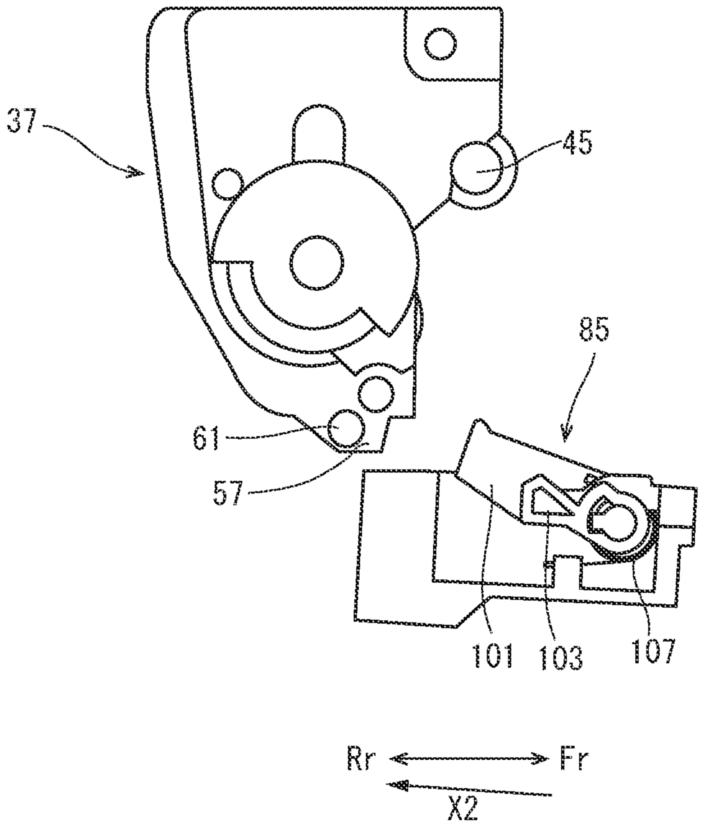
FIG. 13 is a side view explaining the operation of the developing separation mechanism when the image forming unit is attached, in the image forming apparatus according to the embodiment of the present disclosure.

When the image forming unit 25 is further attached, as shown in FIG. 12B, the interference protrusion 57 of the developing device 37 is moved along the upper surface 101*b* of the separation arm 101 and pushes down the separation arm 101. Thus, the arm member 85 is turned in the counterclockwise direction shown in the figure against the biasing force of the torsion coil spring 107.

When the image forming unit 25 is further attached, as shown in FIG. 13, the interference protrusion 57 of the developing device 37 is separated from the separation arm 101. Then, the separation arm 101, that is the arm member 85 is biased by the torsion coil spring 107 to return to the initial state. The developing device 37 is biased to the developing position by the torsion coil spring.

As described above, according to the present disclosure, when the image forming unit 25 is drawn out from the housing 3, the boss 61 of the image forming unit 25 abuts against the retreat arm 103 and rotates the retreat arm 103, so that the arm members 85 (the separation arm 101 and the retreat arm 103) is turned from the initial posture to the retreat posture, and therefore the arm members 85 (the retreat arm 101) do not prevent the development device 37 from being drawn out. In this way, the image forming unit 25 can be smoothly drawn out and attached by a simple configuration containing the boss 61 provided on the side plate 31 of the image forming unit 25 and the retreat arm 103 provided on the arm member 85 of the developing separation mechanism 81. Since the boss 61 and the retreat arm 103 can be arranged in a narrow space, the size of the developing separation mechanism 81 can be made small.

As described above, in the state where the image forming unit 25 is attached after being drawn out once, all the developing devices 37 are turned to the developing position, and the color separation lever 83C and the monochrome separation lever 83B of the developing separation mechanism 81 are translated to the upper position (see FIG. 13). Therefore, it is necessary to switch the image forming unit 25 to the four-color separation state (the home position) in which all the developing devices 37 are turned to the separated position before starting the printing operation (referred to as the home position correction). This home position correction will be described with reference to FIG. 9A to FIG. 9C.

As described above, the gear portion 115 of the two-stage cam 87 of the developing separation mechanism 81 is meshed with the driving gear 117, and the driving gear 117 is driven by the solenoid through the tooth lacking. The solenoid is switched between energization and non-energization by a control part (not shown). The control part rotates the driving gear 117 in one direction by 120 degrees through the tooth lacking gear by repeating the energization and the non-energization of the solenoid. As a result, the two-stage cam 87 is rotated in one direction by 120 degrees to the following postures: a posture in which the largest diameter portion of the inner cam 111 and the largest diameter portion of the outer cam 113 are in contact with the lower surface of the color separation lever 83C and the lower surface of the monochrome separation lever 83B (see FIG. 9A, the four-color separation state); a posture in which the smallest diameter portion of the inner cam 111 and the smallest diameter portion of the outer cam 113 are in contact with the lower surface of the color separation lever 83C and the lower surface of the monochrome separation lever 83B (see FIG. 9B, the color printing state); and a posture in which the largest diameter portion of the inner cam 111 comes into contact with the lower surface of the color separation lever 83C and the smallest diameter portion of the outer cam 113 are in contact with the lower surface of the monochrome separation lever 83B (see FIG. 9C, the monochrome printing state).

Further, the left side plate 71 of the intermediate transfer device 27 is provided with a sensor 121 which is switched between an ON state and an OFF state by the tip portion of the separation arm 101 of the arm member 85 supported by the monochrome separation lever 83B. The sensor 121 is, for example, an optical sensor that forms an optical path between a light emitting section and a light receiving section. When the optical path is blocked by the tip portion of the separation arm 101, the sensor 121 outputs an ON signal indicating the ON state to the control part, and when the tip portion of the separation arm 101 is separated from the optical path, the sensor 121 outputs an OFF signal indicating the OFF state to the control part. In this embodiment, when the monochrome separation lever 83B is translated upward (see FIG. 9A), the tip portion of the separation arm 101 is separated from the optical path of the sensor 121, and the sensor 121 outputs the OFF signal to the control part. On the other hand, when the monochrome separation lever 83B is translated to the lower position (see FIG. 9B and FIG. 9C), the optical path of the sensor 121 is blocked by the tip portion of the separation arm 101, and the ON signal is output to the control part.

When the image forming unit 25 is attached, the monochrome separation lever 83B is translated to the upper position (see FIG. 9A), and the tip portion of the separation arm 101 is separated from the optical path of the sensor 121. Thus, the sensor 121 outputs the OFF signal to the control part. When the control part detects that the image forming unit 25 is attached in a state where the OFF signal is being input from the sensor 121 to the control part, the control part controls the solenoid to energize and then de-energize. As a result, the two-stage cam 87 is rotated by 120 degrees, and the color separation lever 83C and the monochrome separation lever 83B are translated to the lower position (see FIG. 9B). Then, the tip portion of the separation arm 101 of the monochrome separation lever 83B blocks the optical path of the sensor 121, and the sensor 121 outputs the ON signal to the control part.

After the ON signal is input, the control part controls the solenoid to energize and then de-energize. As a result, the two-stage cam 87 is rotated by 120 degrees to translate the color separation lever 83C to the upper position, and the monochrome separation lever 83B remains at the lower position (see FIG. 9C). As a result, the color developing devices 37Y, 37M, and 37C are turned to the separated positions, and the monochrome developing device 37B remains at the developing position. Since the tip portion of the separation arm 101 of the monochrome separation lever 83B blocks the optical path of the sensor 121, the sensor 121 continuously outputs the ON signal to the control part.

Thereafter, the control part controls the solenoid to energize and then de-energize. As a result, the two-stage cam 87 is rotated by 120 degrees, and the monochrome separation lever 83B is translated to the upper position (see FIG. 9A). As a result, the monochrome developing device 37B is turned to the separated position. The tip portion of the separation arm 101 of the monochrome separation lever 83B is separated from the optical path of the sensor 121, and the sensor 121 outputs the OFF signal to the control part.

As described above, when the control part detects that the image forming unit 25 is attached, and when the solenoid is energized and de-energized three times, and then when the output from the sensor 121 is switched from the ON signal to the OFF signal, both the color separation lever 83C and the monochrome separation lever 83B are translated to the upper position, and the developing devices 37 are moved from the developing position to the separated position. That is, the image forming unit 25 is switched to the four-color separation state and returns to the home position. After the image forming unit 25 is attached, the control part executes the home position correction. Thus, at the start of printing, all the developing devices 37 are turned to the separated position.

Figure 14:
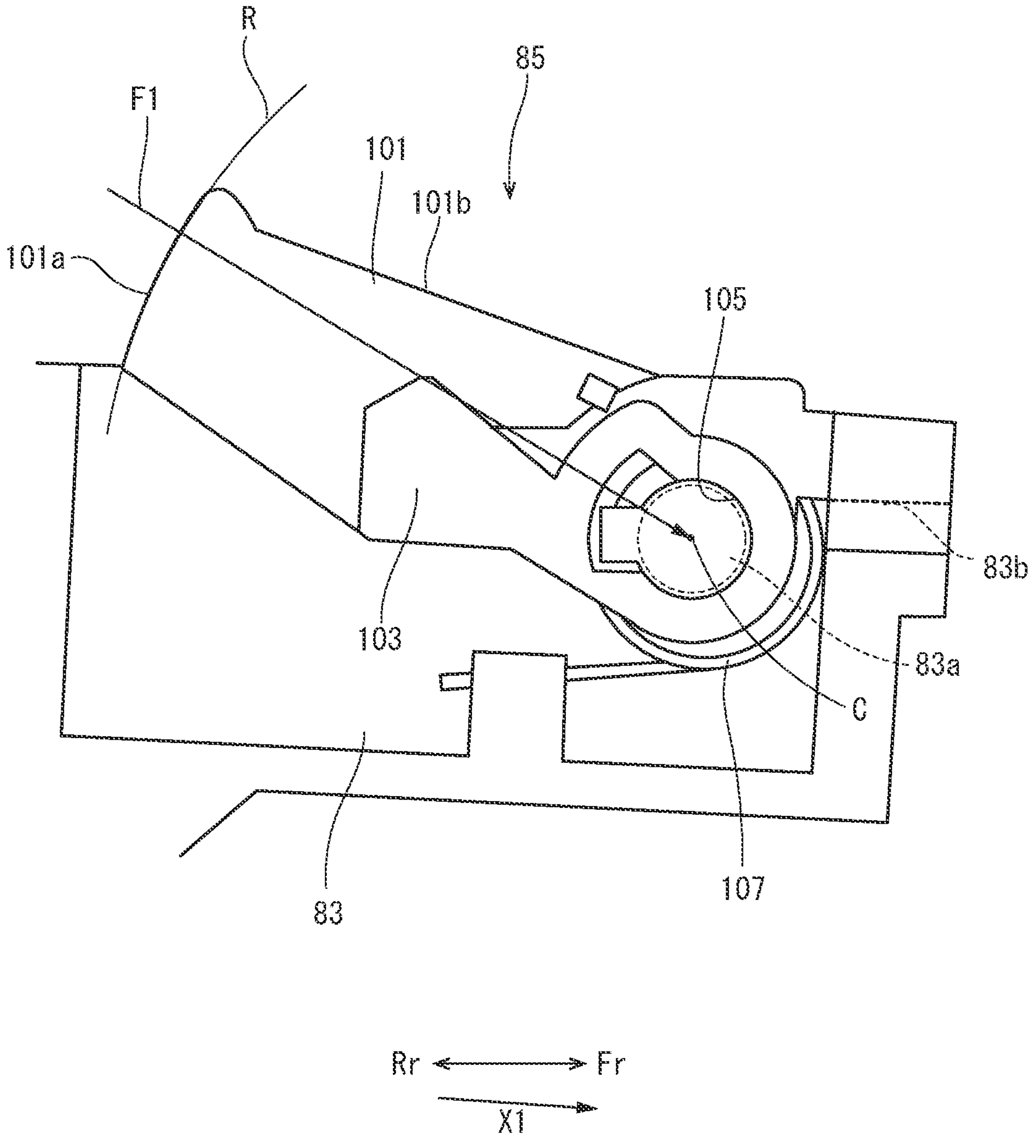
FIG. 14 is a side view showing a modified example of the arm member (separation arm) of the developing separation mechanism of the image forming apparatus according to the embodiment of the present disclosure.

Next, a modified example of the separation arm 101 of the arm member 85 will be described with reference to FIG. 14. FIG. 14 is a side view showing the arm member 85.

The tip end surface 101*a* of the separation arm 101 of the arm member 85 according to the modified example is formed in an arc shape along a circle R centered at the rotational center C of the arm member 85. In order to separate the developing device 37 from the photosensitive drum 35, it is necessary for the separation arm 101 to be applied with a force in the clockwise direction when the interference protrusion 57 of the developing device 37 abuts against it. That is, it is necessary to set the force applied from the interference protrusion 57 of the developing device 37 in the direction in which the separation arm 101 is raised (turned in the clockwise direction). Therefore, in the above-described embodiment (see FIG. 5), when the force F1 is applied along the direction perpendicular to the tip end surface 101*a*, the extension line F1' of the applied force F1 is set to pass above the rotational center C of the arm member 85.

On the other hand, when the separation arm 101 is made difficult to fall down, the load at the time of drawing out the image forming unit 25 becomes large. Therefore, it is preferable that the separation arm 101 does not fall down (does not turn in the counterclockwise direction) due to the load applied from the developing device 37 while easily falls down (easily turns in the counterclockwise direction) when the image forming unit 25 is drawn out.

Therefore, by forming the tip end surface 101*a* in an arc shape centered on the rotational center C of the arm member 85, the force applied from the developing device 37 is directed toward the rotational center C even if the interference protrusion 57 abuts on any area on the tip end surface 101*a*. Therefore, even if the interference protrusion 57 of the developing device 37 abuts against any position of the front end surface 101*a*, the arm member 85 can hardly be rotated in the counterclockwise direction. Therefore, when the image forming unit 25 is drawn out, the developing device 37 can be stably turned in the direction separated from the photosensitive drum 35.

Although the present disclosure has been described in particular embodiments, the present disclosure is not limited to the foregoing embodiments. A person skilled in the art may modify the above embodiments, so long as they do not deviate from the scope and subject matter of the present disclosure

The invention claimed is:

1. An image forming apparatus comprising:

an image forming unit including an image carrier on which an electrostatic latent image is formed and a developing device which includes a developing member developing the electrostatic latent image and movable in a developing position where the developing member is in contact with the image carrier and a separated position where the developing member is separated away from the image carrier, and configured to be drawn out from an apparatus main body; and a developing separation mechanism which moves the developing device from the developing position to the separated position, wherein the developing separation mechanism includes an arm member configured to interfere with the developing device from a downstream side of a draw-out direction so as to move the developing device from the developing position to the separated position, and to be turned to an upstream side of the draw-out direction by the image forming unit when the image forming unit is drawn out and then be separated from the developing device, the image forming unit includes:

a side plate by which the developing device is turnably supported;

an interference protrusion provided in the developing device; and a boss provided on the side plate, and the arm member includes:

a separation arm rotatable in an initial posture for moving the developing device from the developing position to the separated position by abutting on the interference protrusion from the downstream side in the draw-out direction of the image forming unit, and in a retreating posture separated from the interference protrusion to the upstream side in the draw-out direction, and a retreat arm rotatable together with the separation arm and configured to be abut against the boss, wherein when the image forming unit is drawn out from the apparatus main body, the boss abuts against the retreat arm and turns the retreat arm to the upstream side in the draw-out direction, so that the separation arm is turned from the initial posture to the retreat posture together with the retreat arm.

2. The image forming apparatus according to claim 1, comprising:

a biasing member which maintains the arm member in the initial posture inclined upward toward the upstream side of the draw-out direction, wherein the separation arm has a tip end surface against which the interference protrusion abuts, and the tip end surface of the separation arm is formed such that when a force is applied along a direction perpendicular to the tip end surface of the separation arm, an extension line of the applied force passes above a center of rotation of the arm member, and the retreat arm has a tip end surface against which the boss abuts, and the tip end surface of the retreat arm is formed so that when a force is applied along a direction perpendicular to the tip end surface of the retreat arm, an extension line of the applied force passes below the center of rotation of the arm member.

3. The image forming apparatus according to claim 2, wherein, the tip end surface of the retreat arm is disposed on the downstream side of the tip end surface of the separation arm in the draw-out direction.

4. The image forming apparatus according to claim 2, wherein, when the image forming unit is attached to the apparatus main body, the separation arm interferes with the image forming unit to rotate the arm member on the upstream side in the draw-out direction.

5. The image forming apparatus according to claim 2, wherein, the tip end surface of the separation arm is formed in an arc shape centered on the rotational center of the arm member.

6. The image forming apparatus according to claim 1, wherein when the developing separation mechanism interferes with the developing device from the downstream side in the draw-out direction to move the developing device from the developing position to the separated position, a driving force transmission from a driving force of the developing member to the developing member is cut off.

7. The image forming apparatus according to claim 1, wherein the image forming unit includes a monochrome developing device and a color developing device, and the developing separation mechanism switches the image forming unit in a separation state where the monochrome developing device and the color developing device are moved to the separated position; in a color printing state where the monochrome developing device and the color developing device are turned to the developing position; and in a monochrome printing position where the monochrome developing device is turned to the developing position and the color developing device is turned to the separated position.

* * * * *